US009638370B2

(12) United States Patent
Günther et al.

(10) Patent No.: US 9,638,370 B2
(45) Date of Patent: May 2, 2017

(54) LUBRICATING SYSTEM AND VEHICLE WITH A LUBRICATING SYSTEM

(75) Inventors: Armin Günther, Helmstadt-Bargen (DE); Ralf Trinkel, Frankenthal (DE); Bernd Naudszus, Krefeld (DE); Sebastian Godowski, Dortmund (DE); Herbert Kannegießer, Düsseldorf (DE)

(73) Assignee: Lincoln GMBH, Walldorf (DE)

( * ) Notice: Subject to any disclaimer, the term of this patent is extended or adjusted under 35 U.S.C. 154(b) by 554 days.

(21) Appl. No.: 13/555,585

(22) Filed: Jul. 23, 2012

(65) Prior Publication Data

US 2012/0285773 A1    Nov. 15, 2012

Related U.S. Application Data

(63) Continuation of application No. PCT/EP2011/001619, filed on Mar. 31, 2011.

(51) Int. Cl.
   *B60R 17/02*    (2006.01)
   *F16N 7/38*    (2006.01)
   *F16N 29/00*    (2006.01)

(52) U.S. Cl.
   CPC .............. *F16N 7/385* (2013.01); *F16N 29/00* (2013.01); *F16N 2260/02* (2013.01); *F16N 2260/20* (2013.01)

(58) Field of Classification Search
   CPC .... F16N 7/385; F16N 29/00; F16N 2260/02; F16N 2260/20
   USPC .............................................. 184/6.4, 7.2, 6
   See application file for complete search history.

(56) References Cited

U.S. PATENT DOCUMENTS

| 3,025,559 | A |   | 3/1962 | Basinger |
| 3,507,359 | A | * | 4/1970 | Warnock ........................... 184/6 |
| 3,721,898 | A | * | 3/1973 | Dragoumis et al. .......... 324/693 |
| 3,782,501 | A | * | 1/1974 | Pagella .......................... 184/6.4 |

(Continued)

FOREIGN PATENT DOCUMENTS

| CN |   1840952 A | 10/2006 |
| DE | 34 15076 C1 | 11/1985 |

(Continued)

OTHER PUBLICATIONS

International Preliminary Report dated Nov. 12, 2012, for Application No. PCT/EP2011/001619, 6 pages.

(Continued)

*Primary Examiner* — William A Rivera
*Assistant Examiner* — Michael Riegelman
(74) *Attorney, Agent, or Firm* — Senniger Powers LLP

(57) ABSTRACT

A lubricating system for supplying at least one lubricating point with lubricant is described. The lubricating system is equipped with at least one feed device and at least one line extending between this feed device and a lubricating point. In order to very easily and effectively monitor and indicate the severance of a lubricant line, an electrical connection is respectively provided on the feed device and the lubricating point. An electric conductor extending between the two connections is assigned to the line. A monitoring device is assigned to the line in such a way that it generates a signal when the electric conductor is interrupted. The invention furthermore pertains to a vehicle, particularly a construction machine, which is equipped with such a lubricating system.

8 Claims, 1 Drawing Sheet

(56) References Cited

U.S. PATENT DOCUMENTS

| | | | |
|---|---|---|---|
| 4,554,650 A * | 11/1985 | Brown et al. | 367/154 |
| 4,674,030 A * | 6/1987 | Gabriel et al. | 700/79 |
| 4,735,286 A * | 4/1988 | Miki et al. | 184/6.4 |
| 5,126,722 A * | 6/1992 | Kamis | 340/606 |
| 5,203,202 A * | 4/1993 | Spencer | 73/40.5 R |
| 5,305,798 A * | 4/1994 | Driver | 138/98 |
| 5,482,138 A * | 1/1996 | Mori et al. | 184/6.4 |
| 5,551,484 A * | 9/1996 | Charboneau | 138/104 |
| 5,927,316 A * | 7/1999 | Merrill | 137/68.14 |
| 5,992,217 A * | 11/1999 | Jax et al. | 73/40 |
| 6,175,310 B1 * | 1/2001 | Gott | 340/605 |
| 6,265,880 B1 * | 7/2001 | Born et al. | 324/541 |
| 6,334,438 B1 | 1/2002 | Itoh et al. | |
| 6,370,945 B2 * | 4/2002 | Roberts | 73/49.5 |
| 7,042,235 B2 * | 5/2006 | Strackbein et al. | 324/686 |
| 7,770,435 B2 * | 8/2010 | Issel et al. | 73/40 |
| 7,782,062 B2 * | 8/2010 | Bier | 324/525 |
| 7,802,465 B2 * | 9/2010 | Issel | 73/40.7 |
| 2009/0115433 A1 * | 5/2009 | Bier | 324/693 |

FOREIGN PATENT DOCUMENTS

| | | |
|---|---|---|
| DE | 103 18 671 A1 | 11/2004 |
| DE | 10 2005 007 988 A1 | 8/2006 |
| EP | 0 159 580 A2 | 10/1985 |
| FR | 370 582 A | 2/1907 |
| WO | 2006/107378 A1 | 10/2006 |
| WO | 2007 087720 A1 | 8/2007 |
| WO | 2010 028387 A2 | 3/2010 |

OTHER PUBLICATIONS

German International Search Report dated Nov. 11, 2010 from Application No. 20 2010 005 100.2 filed Apr. 15, 2010, 4 pages.

* cited by examiner

LUBRICATING SYSTEM AND VEHICLE WITH A LUBRICATING SYSTEM

FIELD OF INVENTION

The invention pertains to a lubricating system for supplying at least one lubricating point with lubricant, wherein said lubricating system features at least one feed device and at least one line extending between this feed device and a lubricating point. The invention furthermore pertains to a vehicle, particularly a construction machine, with a lubricating system of this type.

BACKGROUND OF INVENTION

Lubricating systems are frequently used in vehicles, particularly in construction machinery such as excavators or the like, as well as in stationary systems, in order to adequately supply lubricant to a plurality of lubricating points, e.g., bearings. DE 34 15 076 C1 discloses a central lubricating device that can also be used in vehicles. In this publication, it is proposed to use a central lubrication piston pump as well as several distributors as lubricant feed device. Lubricant lines extend from these distributors to the individual lubricating points to be supplied with lubricant.

In construction machines, the lubricant lines, i.e., the individual lines extending from a feed device to a lubricating point, are frequently severed. This often occurs in the region of the shovel or in the region of other tools of construction machines that are subjected to significant mechanical loads. In such instances, the concerned lubricating points are no longer lubricated such that, e.g., very costly bearing damage can occur.

The present invention, in contrast, is based on the objective of making available a lubricating system of the initially cited type that is suitable, in particular, for use in vehicles and makes it possible to easily and effectively monitor the severance of such a line.

SUMMARY OF INVENTION

According to the invention, this objective is essentially attained with a lubricating system with the characteristics of Claim 1. If an electrical connection is respectively provided on the feed device and on the lubricating point and an electric conductor extending between these two connections is assigned to the line that extends between the feed device and the lubricating point, a monitoring device of the line may be realized such that it generates a signal when the electric conductor extending between the two connections is interrupted. The invention therefore is based on the notion that the severance of a line can be detected due to the interruption of an electric conductor extending parallel to this line. In this way, the severance of a lubricant line can be very easily and effectively monitored and indicated such that the line can, if applicable, be quickly repaired before time-consuming and cost-intensive damage occur, e.g., on a bearing or similar lubricating point.

If an electrical connection cannot be arranged on the feed device and/or the lubricating point itself for structural or other reasons, the electric conductor may extend up to an electrical connection that is arranged at any other location and may be respectively fixed on or in the immediate vicinity of the feed device and the lubricating point in such a way that a severance of the line causes the electric conductor extending parallel thereto between the feed device and the lubricating point to be interrupted. According to the invention, it would therefore be possible, e.g., to install a cable from a feed device up to a lubricating point parallel to a line to be monitored, to fix the cable at this location and to ultimately route the cable back to a ground connection near the feed device.

The electric conductor can be realized with particularly simple means if the line itself is realized in the form of an electric conductor or the electric conductor is integrated into the line. The lubricant line may be realized, e.g., in the form of a steel tube or the like. Alternatively, it would also be possible to utilize a hose that is realized, e.g., with a steel reinforcement or a reinforcement of another suitable electrically conductive material. In this way, it can be ensured that the monitoring device only generates a corresponding signal when the line itself is actually severed.

A particularly simple method that is also suitable for retrofitting existing lubricating systems consists of installing the electric conductor parallel to the line. For example, a cable or the like can be installed along a lubricant line that does not have to be realized in an electrically conductive fashion in this case.

In order to maintain the constructional expenditures as low as possible, it is preferred that the electrical connection on the lubricating point be a ground connection and that the electrical connection on the feed device be a ground disconnect that is electrically insulated from the feed device. When using the inventive lubricating system in a vehicle or a construction machine, the electrical connection at the lubricating point may be connected, e.g., to the vehicle body and/or the chassis or a component that is electrically connected thereto such as, e.g., a bearing, an excavator shovel or a similar tool. The electric conductor should have no electric contact to ground between the two connections. At the ground disconnect assigned to the feed device, the electric conductor and therefore a ground connection is electrically connected to the inputs of an evaluation device (monitoring device).

It was determined that it is particularly advantageous if the monitoring device features means for generating an optical signal. For example, the monitoring device may feature, e.g., at least one light-emitting diode (LED), the illumination of which indicates whether or not the electric conductor and therefore the lubricant line is severed. Alternatively, it would also be possible to indicate the severance of a lubricant line in the form of a color change of the optical signal. This can be realized with dichromatic light-emitting diodes or several light-emitting diodes or the like. Alternatively or additionally, it would also be possible to output an acoustical signal or another suitable signal in order to alert the operator of the severed line.

A particularly simple design of the monitoring device can be achieved if it features at least one relay such that the relay can be connected, e.g., to the positive pole of a battery or a similar power source while the second terminal is connected to the electric conductor (ground connection) assigned to the line to be monitored. As long as the relay is connected to the ground connection, it can switch on, e.g., a green LED and switch off this LED and/or switch on a red LED when the ground connection is interrupted. Alternatively, it would also be possible to only switch on an LED when the electric conductor is separated from the ground connection, i.e., when the line to be monitored has been severed.

In an additional development of the object of the invention, the monitoring device may also respectively feature or be connected to a stored program control (SPC).

In the context of the inventive lubricating system, the term feed device may refer to any lubricant pump and/or at least one lubricant distributor. The inventive lubricating system is also suitable for simultaneously monitoring several lines that extend, e.g., from a lubricant distributor to individual lubricating points with particularly simple means. For this purpose, a corresponding electric conductor can be assigned to each of the lines to be monitored. In this case, the monitoring device may either monitor the lines individually or jointly such that a signal is output when any of the lines is severed. If several lines are monitored, however, it is preferred to output an individual signal for each of these lines such that it is possible to infer whether or not a certain line is interrupted.

The inventive lubricating system is described in an exemplary fashion with reference to monitoring a lubricant line by means of an electric conductor. According to the invention, however, it would basically also be possible to utilize a different conductor such as, e.g., an optical waveguide for monitoring whether or not a line is severed.

An inventive vehicle features at least one lubricating system of the above-described type. In this case, it is preferred that the electrical connection on the at least one lubricating point be connected to the vehicle body and/or the chassis or a component that is in electric contact therewith. It is basically possible to monitor all lubricant lines in this case. However, it is preferred to use the inventive monitoring device for at least monitoring whether or not the lubricant lines assigned to the drive and/or the bearing of a shovel or similar tool are severed.

The invention is described in greater detail below with reference to an exemplary embodiment that is illustrated in the drawings. In this respect, all described and/or graphically illustrated characteristics individually form the object of the invention regardless of their combination in the claims or their references to other claims.

DETAILED DESCRIPTION

Figure 1:
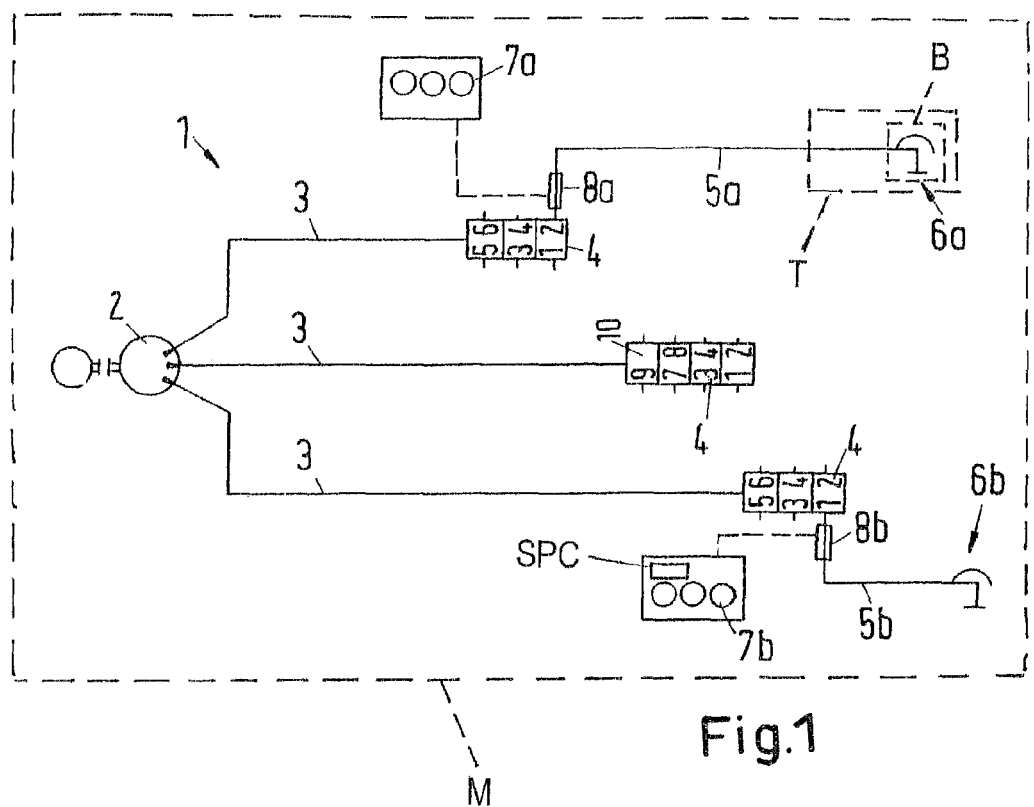
FIG. 1 shows a schematic diagram of an inventive lubricating system.

The lubricating system 1 illustrated in FIG. 1 features a pump 2 that feeds lubricant from a not-shown lubricant reservoir to lubricant distributors 4 via lines 3. Lubricant lines 5a and 5b lead from the lubricant distributor 4 to lubricating points 6a, 6b that serve, e.g., for the lubrication of bearings or the like. In the embodiment shown, lubricant outlets are respectively connected to a line 5a or 5b only at two distributors 4. However, lines that lead to lubricating points basically may also be connected to several lubricant distributors 4. In this case, the pump 2 and the lubricant distributor 4 respectively form a feed device for feeding lubricant to a lubricating point. The lines 3, 5a and 5b respectively form lubricant lines arranged between a feed device and lubricating points 6a, 6b. For example, the lubricating system 1 may be used in a vehicle such as a body and/or chassis of a construction machine M and the lubrication point 6a may be a bearing on a shovel or other tool T.

FIG. 1 furthermore shows a monitoring device 7a, 7b that monitors the two lines 5a, 5b. For this purpose, the two lines 5a, 5b respectively consist of an electrically conductive material, or such an electrically conductive material is integrated into the lines 5a, 5b, e.g., in the form of a reinforcement. Thus, in addition to carrying lubricant, lines 5a, 5b are electric conductors. In the region of the two lubricating points 6a, 6b, the electric conductors are electrically connected 11a, 11b, respectively, such as, e.g., a component that is connected to the chassis. The lines 5a, 5b are connected to corresponding lubricant outlets of the distributors 4, but feature a ground disconnect 8a, 8b such that they respectively are electrically insulated from the feed device (lubricant distributor 4). These ground disconnects 8a, 8b are electrically connected to the monitoring device 7a, 7b, of which only a device for outputting an optical signal is illustrated in FIG. 1.

Figure 2:
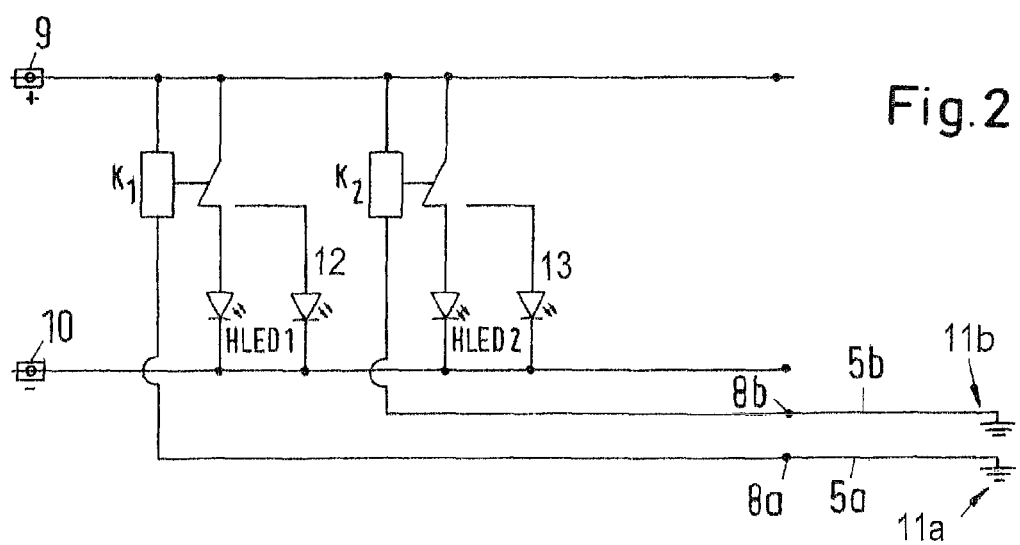
FIG. 2 shows the circuit diagram of the monitoring device of the lubricating system according to FIG. 1.

The design or circuit diagram of the monitoring device 7a, 7b is illustrated in greater detail in FIG. 2. The positive pole 9 of the battery or similar power source is connected to two relays $K_1$ and $K_2$. The other input of the two relays is as represented in FIG. 1 respectively connected to the ground connections of the lubricating points 6a, 6b via the lines 5a, 5b. Red and green LEDs 12, 13, respectively, in each monitoring device 7a, 7b are also connected to the positive pole 9 and the negative pole 10 of the battery and can be switched on or off for each of the lines 5a, 5b by means of the two relays K1 and K2.

When one of the lines 5a or 5b is severed from the respective lubricating point 6a or 6b, the ground connection of the respective relay is also interrupted such that, e.g., the relay switches over from a green LED 13 to a red LED 12. In this way, the lubricant lines 5a, 5b can be monitored with particularly simple means.

LIST OF REFERENCE SYMBOLS

1 Lubricating system
2 Pump
3 Line
4 Lubricant distributor
5a, 5b Lubricant line and electrical conductor
6a, 6b Lubricating point
7a, 7b Monitoring device
8a, 8b Ground disconnect
9 Positive pole
10 Negative pole
11a, 11b Ground connection
12 Red LED
13 Green LED
B Bearing
K1 and K2 Relays
M Body and/or chassis of a construction machine
T Shovel or other tool

The invention claimed is:

1. A lubricating system for supplying a lubricating point with lubricant, comprising a feed device and a line extending between the feed device and the lubricating point, wherein electrical connections are provided on the feed device and the lubricating point, wherein the electrical connection on the lubricating point is a ground connection and the electrical connection on the feed device is a ground disconnect that is electrically insulated from the feed device, wherein an electric conductor extending between the electrical connections is integrated into the line between the feed device and the lubricating point, and wherein a monitoring device is connected to the line in such a way that the monitoring device generates a signal when the electric conductor is interrupted.

2. The lubricating system according to claim 1, wherein the electric conductor extends parallel to the line.

3. The lubricating system according to claim 1, wherein the monitoring device comprises means for generating an optical signal comprising a light-emitting diode.

4. The lubricating system according to claim 1, wherein the monitoring device comprises a relay.

5. The lubricating system according to claim 1, wherein the monitoring device comprises a stored program control.

6. The lubricating system according to claim 1, wherein the feed device comprises a pump or a lubricant distributor.

7. A construction machine comprising a lubricating system according to claim 1, wherein the electrical connection on the lubricating point is connected to a body and/or a chassis of the machine or to a component that is in electrical contact with the body or chassis of the machine.

8. A construction machine according to claim 7, said construction machine having a shovel or similar tool, wherein the lubricating point is assigned to a drive and/or a bearing of the shovel or similar tool.

* * * * *